(No Model.) 6 Sheets—Sheet 1.

W. H. DOANE & G. W. BUGBEE.
MACHINE FOR PLANING WHEEL FELLIES.

No. 285,587. Patented Sept. 25, 1883.

(No Model.) 6 Sheets—Sheet 2.

W. H. DOANE & G. W. BUGBEE.
MACHINE FOR PLANING WHEEL FELLIES.

No. 285,587. Patented Sept. 25, 1883.

Inventors:
William H. Doane
George W. Bugbee
by Their Attorney

Attest:
E. D. Walker
A. M. Long (No Model.) 6 Sheets—Sheet 3.
W. H. DOANE & G. W. BUGBEE.
MACHINE FOR PLANING WHEEL FELLIES.
No. 285,587. Patented Sept. 25, 1883.
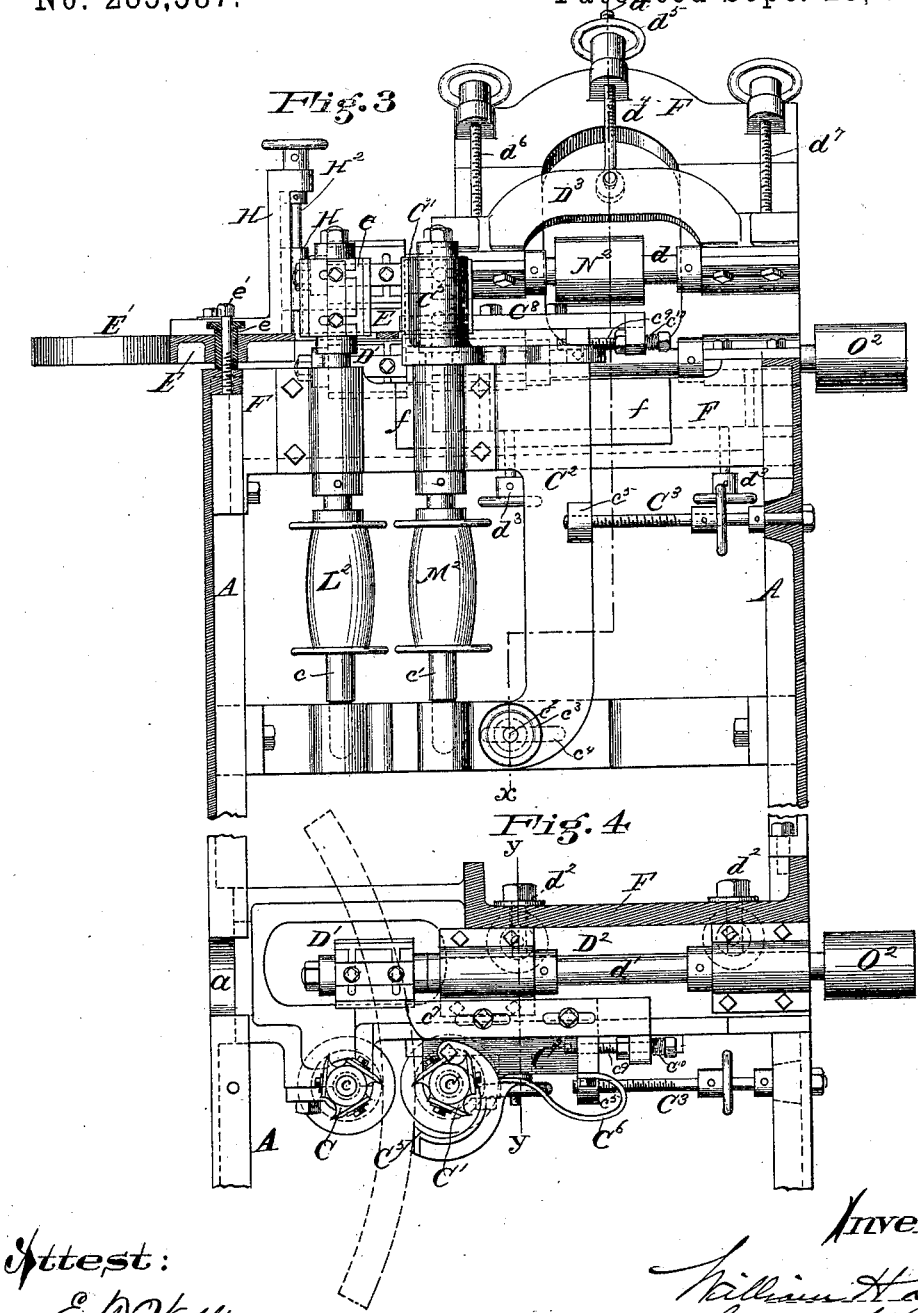

(No Model.) 6 Sheets—Sheet 4.
W. H. DOANE & G. W. BUGBEE.
MACHINE FOR PLANING WHEEL FELLIES.
No. 285,587. Patented Sept. 25, 1883.
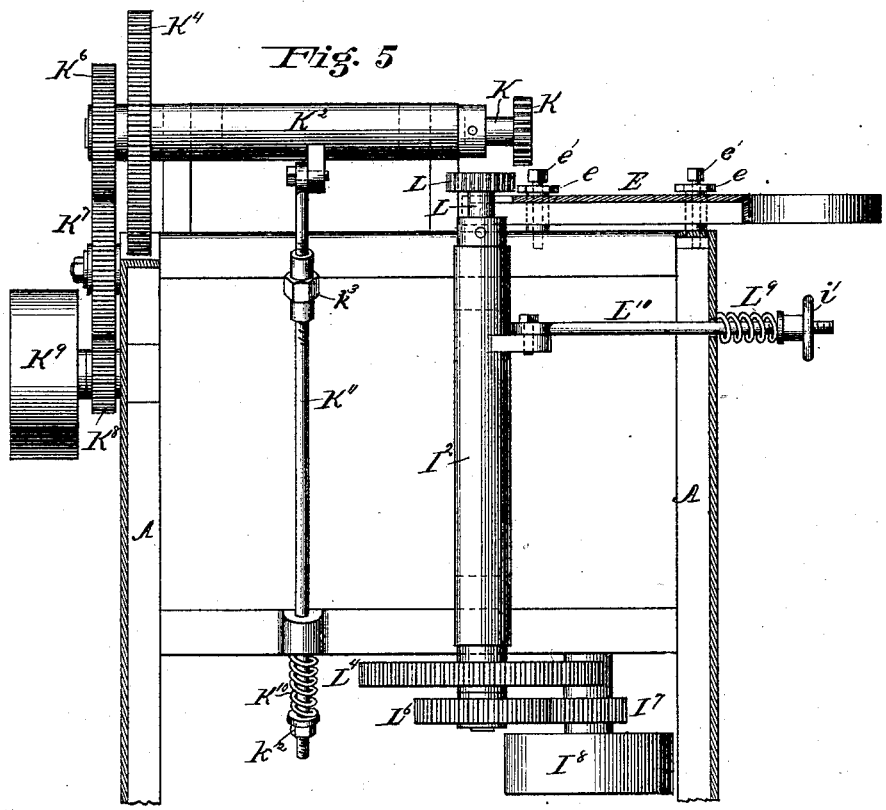
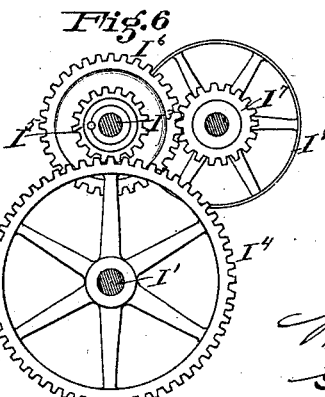
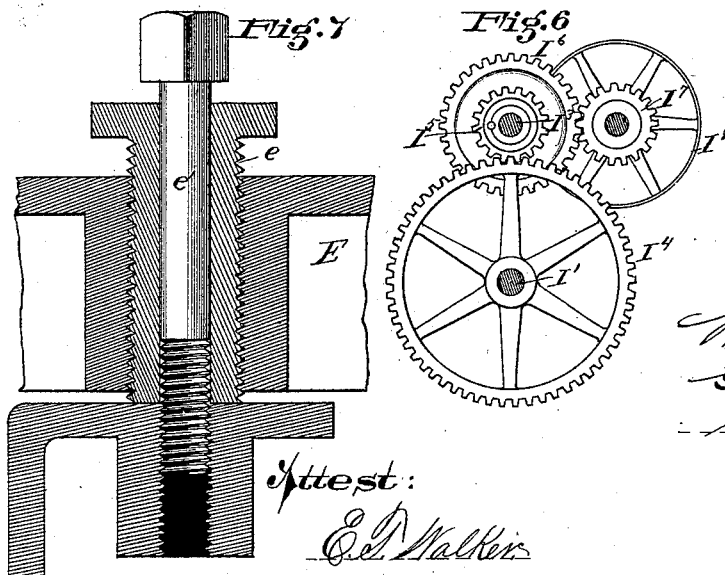
Attest:
E. T. Walker
A. M. Long
Inventors.
William H. Doane
George W. Bugbee
by their attorney (No Model.) 6 Sheets—Sheet 5.
W. H. DOANE & G. W. BUGBEE.
MACHINE FOR PLANING WHEEL FELLIES.
No. 285,587. Patented Sept. 25, 1883.
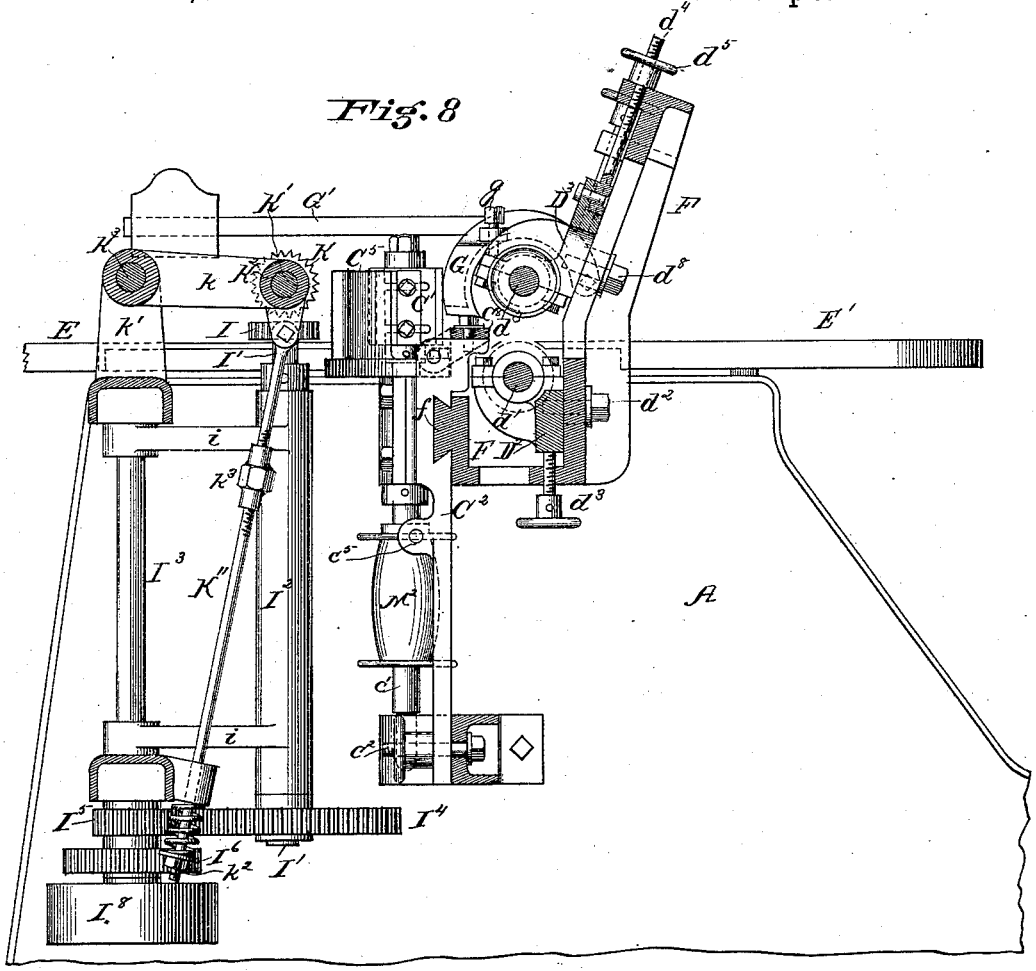
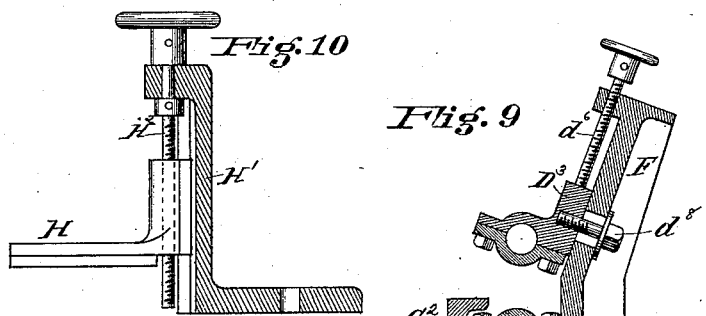
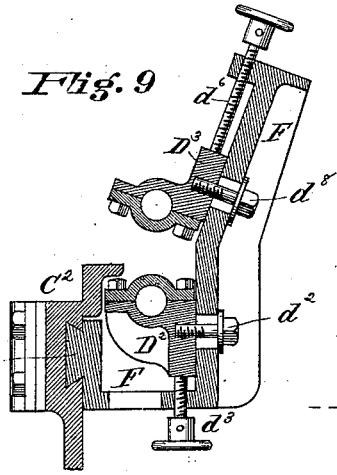
Attest:
E. D. Walker
A. M. Long
Inventors.
William H. Doane
George W. Bugbee
by their attorney (No Model.) 6 Sheets—Sheet 6.
W. H. DOANE & G. W. BUGBEE.
MACHINE FOR PLANING WHEEL FELLIES.
No. 285,587. Patented Sept. 25, 1883.
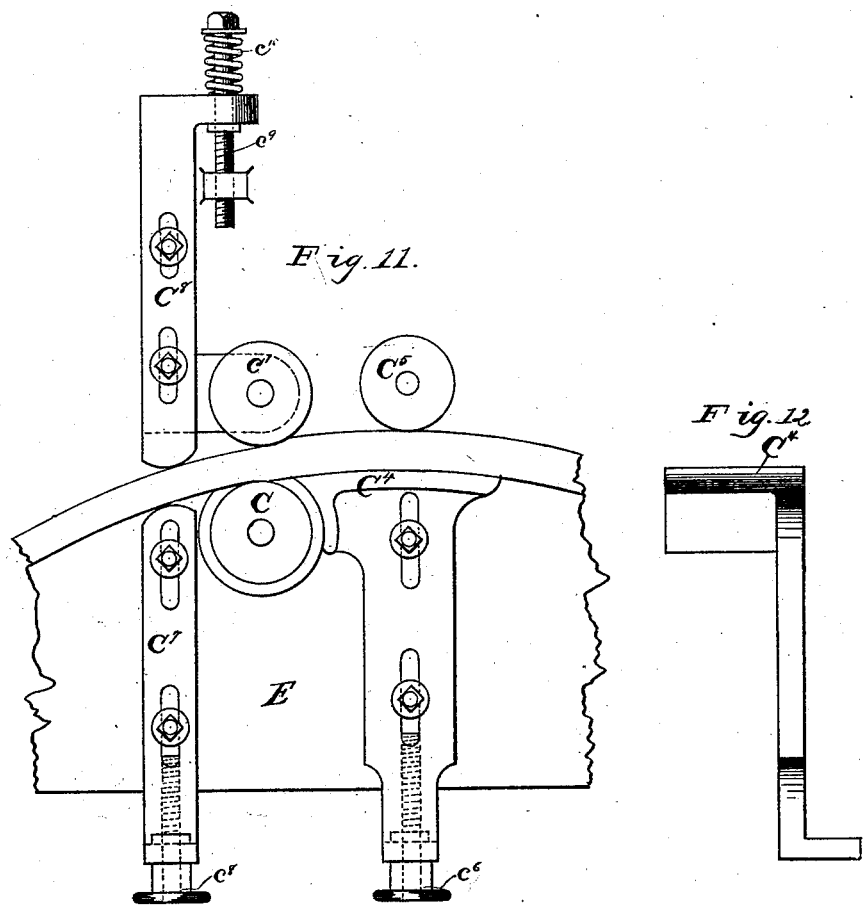

UNITED STATES PATENT OFFICE.

WILLIAM H. DOANE AND GEORGE W. BUGBEE, OF CINCINNATI, OHIO.

MACHINE FOR PLANING WHEEL-FELLIES.

SPECIFICATION forming part of Letters Patent No. 285,587, dated September 25, 1883.

Application filed November 16, 1882. (No model.)

*To all whom it may concern:*

Be it known that we, WILLIAM H. DOANE and GEORGE W. BUGBEE, citizens of the United States, residing at Cincinnati, in the county of Hamilton and State of Ohio, have invented certain new and useful Improvements in Machines for Planing Wheel-Fellies; and we do hereby declare the following to be a full, clear, and exact description of the invention, such as will enable others skilled in the art to which it appertains to make and use the same.

This invention relates to machines for planing bent or sawed fellies of wheels.

Our improvement is designed to so construct machines for this purpose that the fellies may be planed on all four sides during a single pass through the machine.

To this end it consists of certain mechanical combinations separately stated in claims at the close of this specification, and also of details of construction set forth in other claims.

In order that the invention may be clearly understood, we have illustrated in the annexed drawings and will proceed to describe the best form thereof at present known to us.

Figure 1:
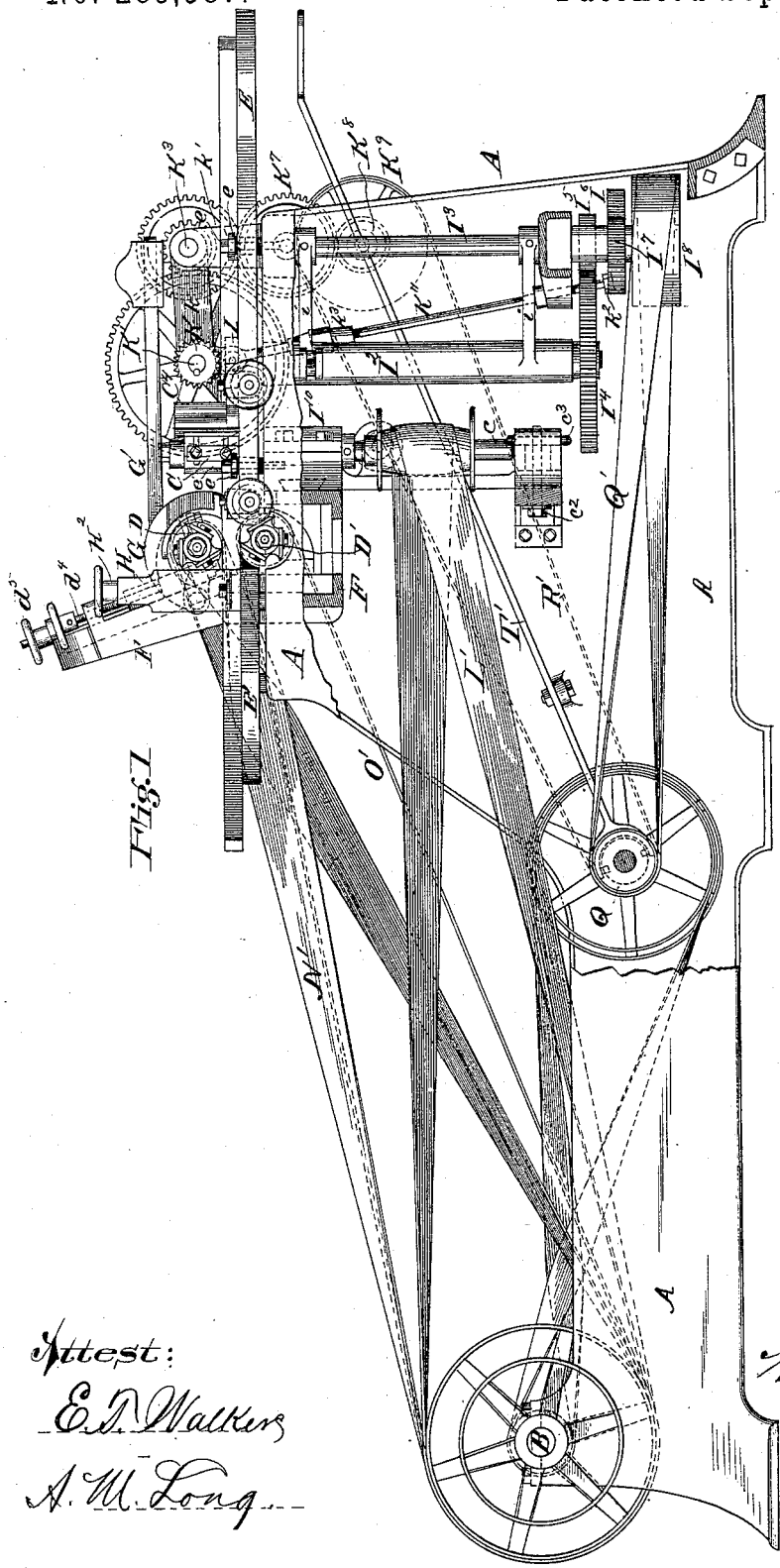
Figure 2:
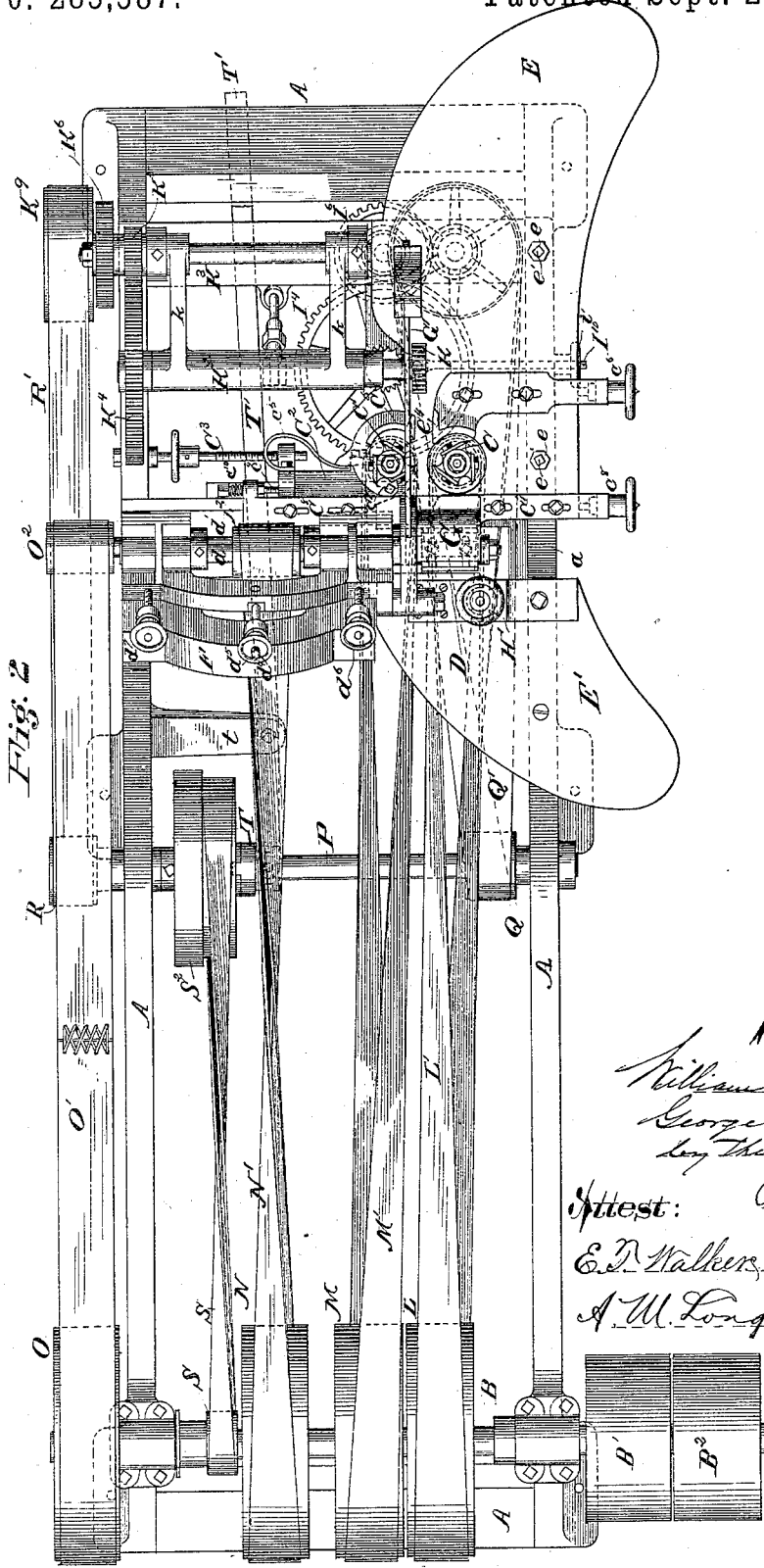

Figure 1 is a side elevation (with one frame partly removed) of a rim-planing machine embodying our invention. Fig. 2 is a plan of the same. Fig. 3 is a transverse section of the machine in elevation, showing cutter-spindles. Fig. 4 is a sectional plan of the frame and housings, showing the vertical and lower horizontal cutter-spindles. Fig. 5 is a transverse section in elevation, showing vertical and horizontal feed devices. Fig. 6 is a plan of the spur-gearing for driving the vertical feed-rolls. Fig. 7 is an enlarged section of the device for adjusting the table vertically. Fig. 8 is a longitudinal section in elevation on the line $x\,x$, Fig. 3. Fig. 9 is a longitudinal section in elevation on the line $y\,y$, Fig. 4. Fig. 10 is a sectional elevation of the guide for keeping the work down upon the table. Figs. 11 and 12 illustrate the guides and chip-breakers which operate in connection with the vertical cutter-heads.

The same letters of reference indicate identical parts in all the figures.

The main frame A of the machine is preferably constructed substantially as shown in the drawings, the sides being made of proper height at the forward end of the machine for the support of the table and other operative parts at an elevation convenient for easy manipulation, while the sides at the rear end, across which the main shaft B of the machine lies supported in suitable bearings, is made low, so that the power for driving the machine may be applied as near its base as practicable. In the present instance the machine is so organized that the bent or sawed fellies are fed through it in a horizontally-curvilinear direction, corresponding to the curvature of the fellies, and are first planed on their vertical sides by a pair of vertical cutter-heads, C and C', and immediately thereafter on their horizontal sides by a pair of horizontal cutter-heads, D and D'. The felly is supported upon the vertically-adjustable table E in advance of the horizontal cutter-heads, and in rear thereof upon the fixed table E'. Table E is provided with externally-screw-threaded sleeves $e$, the lower ends of which rest upon the top rail of main frame A, and by adjusting which, so as to project more or less through its bottom, table E may be raised or lowered to any required extent. A screw-bolt, $e'$, passes through each sleeve into a screw-threaded hole in the main frame, and serves to firmly clamp the table thereto after the proper adjustment has been effected. Fig. 7, illustrating the construction, shows the screw-bolt $e'$ as partly unscrewed, so that the sleeve $e$ may be easily turned for adjusting the table. The tables are preferably made of the curved contour shown, so as to give an extended support to the fellies both in front and in rear of the cutter-heads. The vertical cutter-head C, projecting up through an opening in table E, is secured to the vertical spindle $c$, turning in fixed bearings on the main frame and housing F, respectively. The vertical cutter-head C', passing up through a concavity in the edge of table E, is secured to the vertical spindle $c'$, turning in bearings of a hanger, $C^2$, which is fitted and supported at its upper end on a dovetailed horizontal guide, $f$, formed on the front side of the housing F, and is at its lower end adjustably secured to a horizontal cross-bar of the main frame A by means of a bolt, $c^2$, and a nut, $c^3$, the bolt passing through a horizontal slot, $c^4$, in the said cross-bar. The hanger $C^2$ is adjusted horizontally, so as to move the cutter-head C' toward or away from cutter-head C by means of the screw C³, which is swiveled to the side of the main frame and screwed through a screw-threaded lug, $c^5$, on the hanger. The felly passes to the vertical cutter-heads through between the fixed but adjustable combined guide and chip-breaker C⁴ and the yielding combined guide and chip-breaker C⁵. The combined guide and chip-breaker C⁴, acting on the concave side of the felly, is mounted on table E, and may be adjusted by means of a screw, $c^6$. The combined guide and chip-breaker C⁵ is pivoted by a vertical pin, $c^7$, to hanger C², its free end being forced against the convex side of the felly by the action of a stiff spring, C⁶, one end of which is secured to the hanger C², while the other end thereof bears against a shoulder on the said guide and chip-breaker. Directly in the rear of the vertical cutter-heads are two additional guides, C⁷ and C⁸. The guide C⁷, which bears against the concave of the felly, is fixed upon table E, but may be adjusted to properly bear against the felly by means of the screw $c^8$. The guide C⁸ is fitted to hanger C², and can be adjusted thereon by means of screw $c^9$. This screw $c^9$ is constructed with a collar, against which the inner side of the lug of the guide bears, the outer side thereof being pressed by a spiral spring, $c^{10}$, which encircles the outer end or shank of screw $c^9$, and is confined by a nut on said shank. It will be observed that by reason of the application of the spiral spring $c^{10}$ the guide C⁸ will act with a yielding pressure against the convex side of the felly.

The lower horizontal cutter-head operates through the gap between the tables E and E', being secured to the overhung end of the horizontal spindle $d$, which turns in bearings of a beam, D². This beam is arranged within a recess in the housing F, and is secured to the upright portion of said housing by means of bolts $d^2$, which pass through vertically-elongated holes of the housing and engage screw-holes in the beam. The beam D² is further supported near each end upon the vertical screws $d^3$, which screw through screw-threaded holes in the bottom of the housing F. The beam D² is supported in this manner in order that it may be adjusted to cause the cutter-head D' to cut either at a right angle to the cut of the vertical cutter-heads or at a slight slant, for the purpose of tapering the felly on the lower side, to accomplish which latter effect the beam at the end nearest the cutter-head would have to be adjusted a little higher than the other end thereof. A gap or pocket, $a$, is formed in the side of the main frame adjacent to the cutter-head D', in order that such cutter-head may be conveniently slipped on and off its spindle.

The upper horizontal cutter-head, D, is secured to the overhung end of the spindle $d$, which is journaled in bearing of the yoke D³. This yoke is suspended from the housing by a suspension-rod, $d^4$, the lower end of which is pivoted to the middle of the yoke, while its upper end is screw-threaded and passed through a lug on the housing, being provided with a nut, $d^5$, above the lug. By turning this nut $d^5$ the yoke D³ may be raised or lowered, for the purpose of vertically adjusting the upper cutter-head. The yoke D³ may also be adjusted so as to throw the upper cutter-head on a slant reverse to the slant of the lower cutter-head by means of the set-screws $d^6$ and $d^7$, which are screwed through screw-threaded lugs on the housing F and bear on the top of the yoke near its ends. After the yoke D³ has been properly adjusted it is firmly clamped to the housing F by bolts $d^8$, which pass through elongated holes in said housing, as best seen in Fig. 9. The upper horizontal cutter-head, D, is covered by the segmental hood and chip-breaker G, which is pivoted on a stud-pin secured to the end of yoke D³, and is provided with a weighted lever, G', for holding it to its work. The hood and chip-breaker G is provided with a set-screw, $g$, which limits its downward movement by coming in contact with a suitable stop on the yoke D³.

Immediately in rear of the horizontal cutter-heads is arranged an adjustable presser-foot, H, for holding the felly down on the table E'. The presser-foot is mounted on a bracket, H', secured to table E', and is adjusted up and down by means of a screw, H², swiveled to the bracket and engaging a screw-threaded hole in the shank of the presser-foot, as best seen in Fig. 10.

In the machine illustrated the felly is fed to the cutter-heads by means of a feed-wheel, I, operating on its convex side, and by another feed-wheel, K, operating on its top side. The feed-wheel I is fixed to the upper end of a vertical shaft, I', which is journaled in the long bracket-bearing I², connected by the arms $i\ i$ to the vertical shaft I³, journaled in bearings on the main frame. The spur-wheel I⁴ is keyed to the lower end of shaft I', and is driven by pinion I⁵ on the shaft I³. Said pinion is fixed to the spur-wheel I⁶, and driven by pinion I⁷, keyed to a vertical shaft, which also carries a pulley, I⁸. The feed-wheel I is held to its work with a yielding pressure by a spiral spring, I⁹, which pulls upon the bracket-bearing I² through the medium of the rod I¹⁰, pivoted to said bracket-bearing and passing through the side of the main frame, on the outside of which it is encircled by the said spring I⁹, and provided with a nut, $i'$, for adjusting the tension of the spring.

The feed-wheel K is secured to the overhung end of the horizontal shaft K', which is journaled in the bracket-bearing K², pivoted by arms $k'$ on horizontal shaft K³, fixed in standards on the main frame. Shaft K³ carries at its outer end a pinion, K⁵, which drives spur-wheel K⁴ on shaft K', said pinion K⁵ being fixed to a spur-wheel, K⁶, which is driven by the pinion K⁸ through the medium of idler $K^7$. Pinion $K^8$ is keyed to a short horizontal shaft, to the outer end of which is secured a pulley, $K^9$. Feed-wheel K is held to its work by a spiral spring, $K^{10}$, which pulls on a rod, $K^{11}$, pivoted to a lug on the bracket-bearing $K^2$ and passing through a lug on a cross-bar of the main frame, the spiral spring $K^{10}$ encircling the rod between said lug and a nut, $k^2$, by means of which latter the tension of the spring can be adjusted. The rod $K^{11}$ is made in two parts, connected by a nut, $k^3$, provided with right and left hand screw-threads, so that the length of the rod may be adjusted.

The main shaft B carries the usual fast pulley, B', and loose pulley $B^2$. The spindle of the vertical cutter-head C is provided with a pulley, $L^2$, which is driven by a belt, L', from the pulley L on the main shaft B. The spindle of the vertical cutter-head C' is provided with a pulley, $M^2$, which is driven by a belt, M', from the pulley M on the main shaft. The spindle of the upper horizontal cutter-head D is provided with a pulley, $N^2$, which is driven by a cross-belt, N', from the pulley N on the main shaft. The spindle of the lower horizontal cutter-head is provided with a pulley, $O^2$, which is driven by a straight belt, O', from the pulley O on the main shaft. The pulley $I^8$ of of the feed-gearing which drives feed-wheel I is driven by a belt, Q', from a pulley, Q, on the intermediate shaft, P. Pulley $K^9$ of the feed-gearing which drives feed-wheel K is driven by a belt, R', from pulley R on the intermediate shaft, P. The intermediate shaft, P, carries a loose pulley, $S^2$, which is driven by the cross-belt S' from the pulley S on the main shaft. The hub of the pulley $S^2$ has the form of a female clutch adapted to be engaged by a male clutch, T, feathered to but capable of sliding on the intermediate shaft P. The male clutch T is engaged by a lever, T', fulcrumed on an arm or lug of the main frame and reaching to the forward end of the machine, so that it may be conveniently operated to clutch and unclutch the intermediate shaft, P, and thereby start and stop the feed-works by the workman from the front end of the machine.

Although we prefer to use feed-wheel K as well as feed-wheel I, the former, together with the gearing for driving it, may be dispensed with.

The details of construction of the entire machine may also be greatly varied without departing from the principle of the invention.

While the machine hereinbefore described was more especially designed for planing wheel-fellies, it is obvious that it may be used for planing other curved wood-work.

Having thus described our invention, what we claim is—

1. In a machine for planing all four sides of fellies at a single pass, the combination, substantially as before set forth, of a pair of vertical cutter-heads, a pair of horizontal cutter-heads, an adjustable table in advance of the horizontal cutter-heads, a fixed table in rear thereof, and two pairs of guides for directing the fellies in a curvilinear path through between said cutter-heads.

2. The combination, substantially as before set forth, of the vertical cutter-heads, one being fixed and the other adjustable, the two fixed but adjustable guides arranged, respectively, on opposite sides of the fixed cutter-head, and the two yielding guides arranged, respectively, on opposite sides of the adjustable cutter-head.

3. The combination, substantially as before set forth, of the upper horizontal cutter-head, the suspended yoke in which its spindle is journaled, the housing, the suspension-rod to which said yoke is pivoted at its middle, and which is vertically adjustable on the housing, and an independent set-screw at each end of the housing, adapted to adjust the yoke, as described, whereby the axis of the cutter-head may be thrown into a horizontal or into an inclined plane.

4. The combination, substantially as before set forth, of the lower horizontal cutter-head, the beam in which its spindle is journaled, the recessed housing for said beam, the vertically-adjustable clamping-screws for securing the beam to its housing, and an independent set-screw at each end of the beam, adapted to adjust it, as described, whereby the axis of the cutter-head may be thrown into a horizontal or into an inclined plane.

5. The combination, substantially as before set forth, of the main frame, the adjustable table, the vertically-adjustable sleeve in the table, and a clamping-screw which passes through said sleeve into the main frame.

6. The combination, substantially as before set forth, of the feed-wheel rotating in a vertical plane, the pivoted bearing of its shaft, and rod adjustable in length and combined with a spring, for holding said feed-wheel to its work.

In testimony whereof we affix our signatures in presence of two witnesses.

W. H. DOANE.
GEORGE W. BUGBEE.

Witnesses:
 ALBERT N. SPENCER,
 A. O. BLAKEMORE.